July 9, 1929.  F. GRUEBLER  1,720,414
METHOD AND MEANS FOR WORKING COMBUSTION
ENGINES AT VARIABLE ELEVATIONS
Filed April 1, 1920  4 Sheets-Sheet 1

Inventor
Felix Gruebler
By [signature] Atty.

July 9, 1929.  F. GRUEBLER  1,720,414
METHOD AND MEANS FOR WORKING COMBUSTION
ENGINES AT VARIABLE ELEVATIONS
Filed April 1, 1920    4 Sheets-Sheet 3
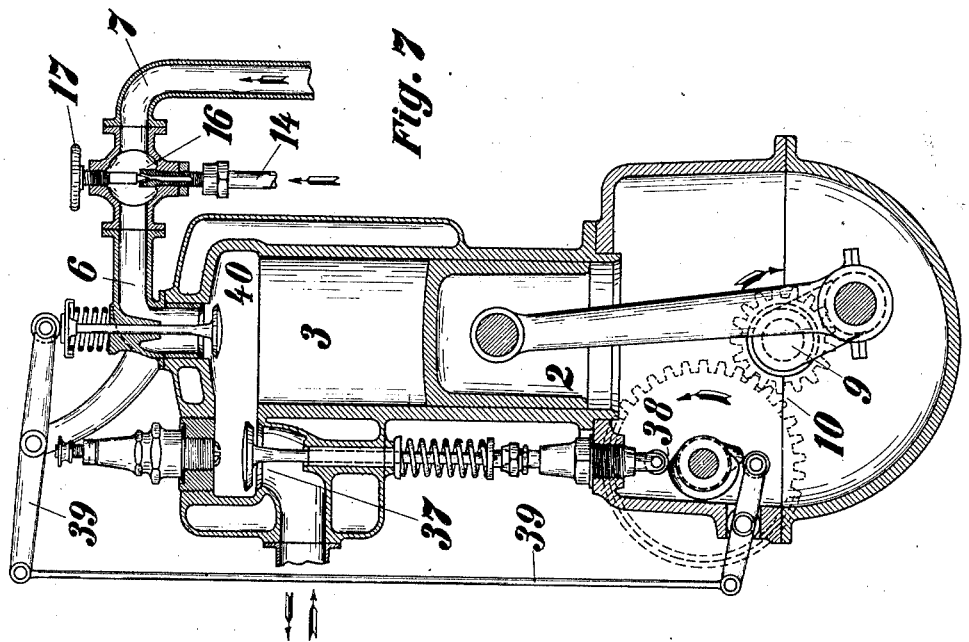
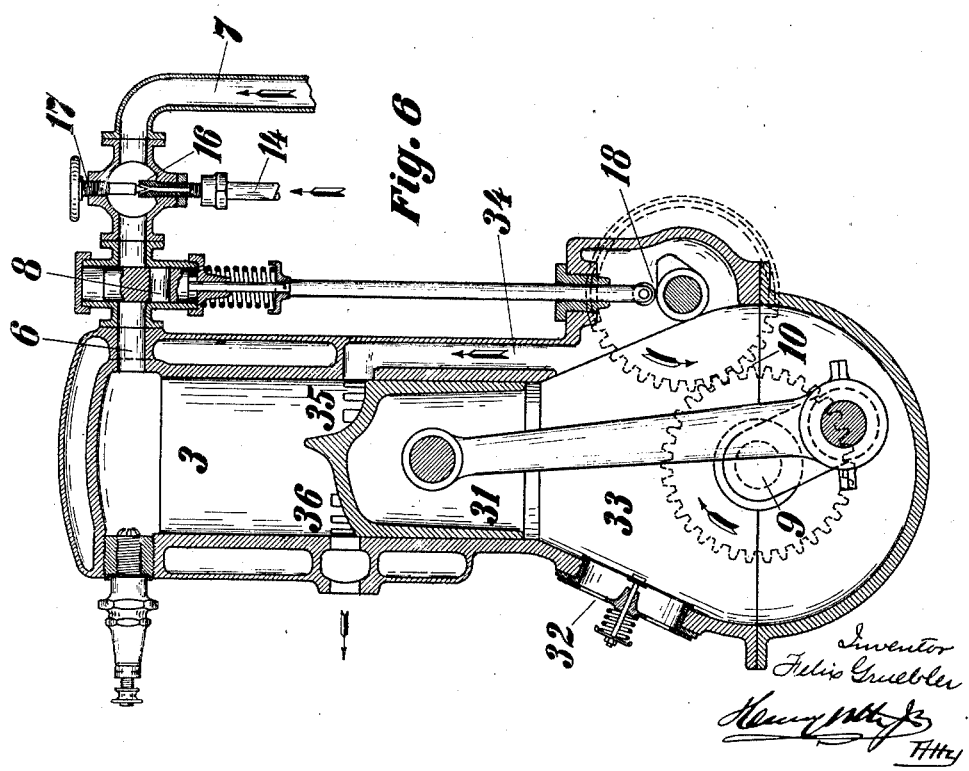

July 9, 1929.　　　　F. GRUEBLER　　　1,720,414
METHOD AND MEANS FOR WORKING COMBUSTION
ENGINES AT VARIABLE ELEVATIONS
Filed April 1, 1920　　　4 Sheets-Sheet 4

INVENTOR.
Felix Gruebler
BY
ATTORNEY.

Patented July 9, 1929.

1,720,414

UNITED STATES PATENT OFFICE.

FELIX GRUEBLER, OF ZURICH, SWITZERLAND.

METHOD AND MEANS FOR WORKING COMBUSTION ENGINES AT VARIABLE ELEVATIONS.

Application filed April 1, 1920, Serial No. 370,516, and in Switzerland April 5, 1919.

The greater the aerial distances are, the greater is the necessity for motors of constant output at high elevations, the conditions of flying improving with the speed. If the output of the motor be constant, the speed of a given air craft increases with the height of flying. Compared to the speed at sea-level, this increase amounts to 25 per cent at 4000 meters, and to 45 per cent at 7000 meters elevation.

The output of the motor being essentially dependent on the weight of the drawn-in charge, the power is greatest at the level of the sea. In that proportion in which the barometric pressure lessens with increasing elevation, the intake charge decreases, and with it the output of the motor. With flying motors the loss of power is little short of 10 per cent for every 1000 meters elevation.

The best known method for maintaining full power at increasing elevations consists in the over-compression of the motor, that is, by decreasing the compression space in order to produce a great relative pressure; but by this method the air pipe must be suitably throttled in low regions, causing considerable loss of power.

Besides the overcompression there exists the so called oversizing of the motor for the purpose of increasing the intake volume by enlarging the cylinders of the motor. By reason of size and weight such over-dimensioning is practicable only to about 20 per cent, and if combined with overcompression the output may be maintained constant up to about 3000 meters. At greater heights the loss of power is the same as for a normal motor.

According to a more recent method the motor is completely shut off from the outside air and all of the combustion air is artificially delivered by a compressor, which because of the weight is preferably of the centrifugal type, at least for flying engines. Such centrifugal pumps are however known for their inferior efficiency in thin atmospheric layers, and on this account they must be built in three stages, and more. Much power is then wasted on the driving of the blower, which works almost uselessly at low elevations and complicates the engine by an extra cooling system. At elevations higher than about 4000 meters the pre-compression of the entire combustion air is rendered impossible by the exigencies of the system, notably by the enormous speed required for gasturbine driven ventilators of small size.

Far better results are obtained if the air pump acts only in support of the motor and the intake charge of outside density is auxiliarly completed to the full weight of charge. According to such a method this is done by means of a variable transmission between the air pump and the motor.

The object of the present invention is the elimination of the variable transmisson system. According to the invention additional air is introduced into the combustion chamber independently of the motor speed. This feature constitutes a fundamental difference from all motors having a charging pump, whether of the blower or of the piston type, within or without the crank case of the motor.

According to the method, forming part of this invention, additional air is delivered by a pump in direct transmission, so that in spite of less outside pressure the cylinder content is not reduced.

The device according to this invention is characterized by the feature, that a pump is provided with means for varying its delivery quantity in co-operation with the atmospheric pressure and independently of the motor speed.

This invention will now be more particularly described with reference to the accompanying drawings, wherein the constructions shown are by way of example only.

Fig. 6 is an elevation of another explosion engine, embodying the invention, and Fig. 7 is a vertical section of an engine similar to Fig.

1 but equipped with a different valve mechanism.

Figure 2:
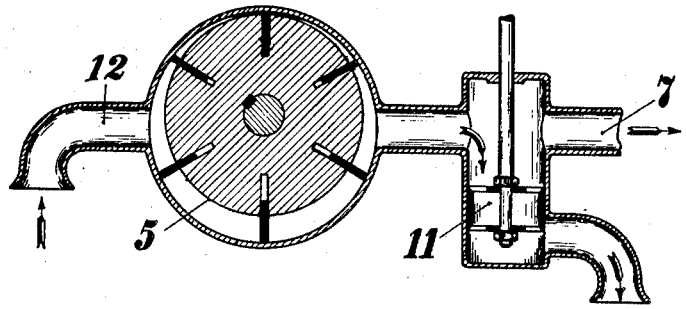
Figure 2 represents a modification of the air pump connections showing a sliding valve in the pressure pipe of the air pump.
Figure 3:
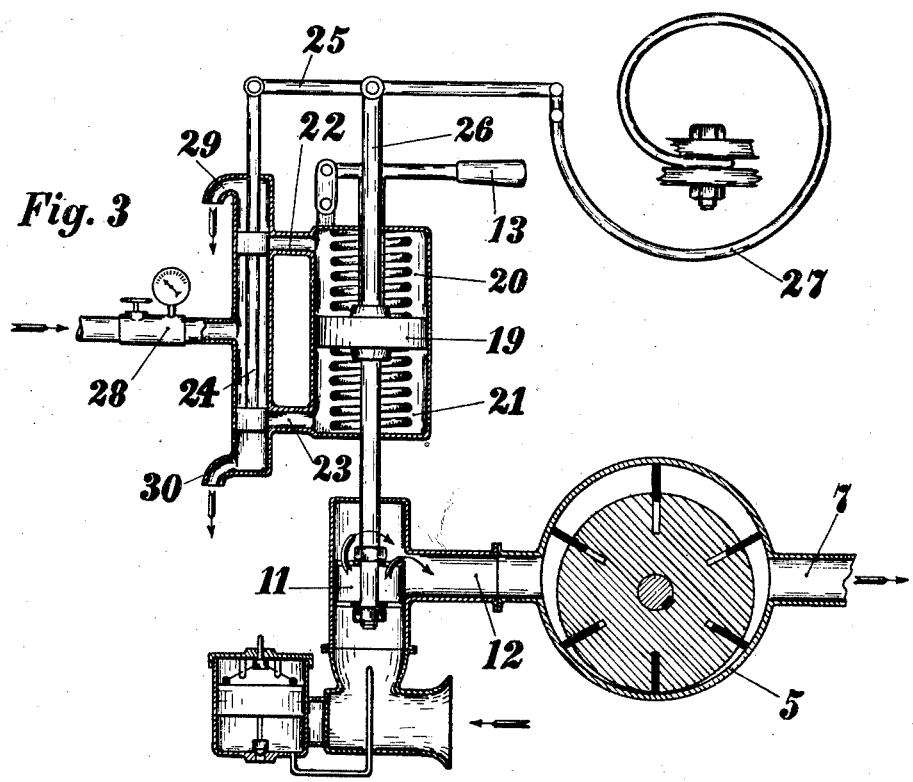
Figure 3 shows another modification and is a vertical cross section through a servo-motor with a carburettor in the suction pipe.
Figure 8:
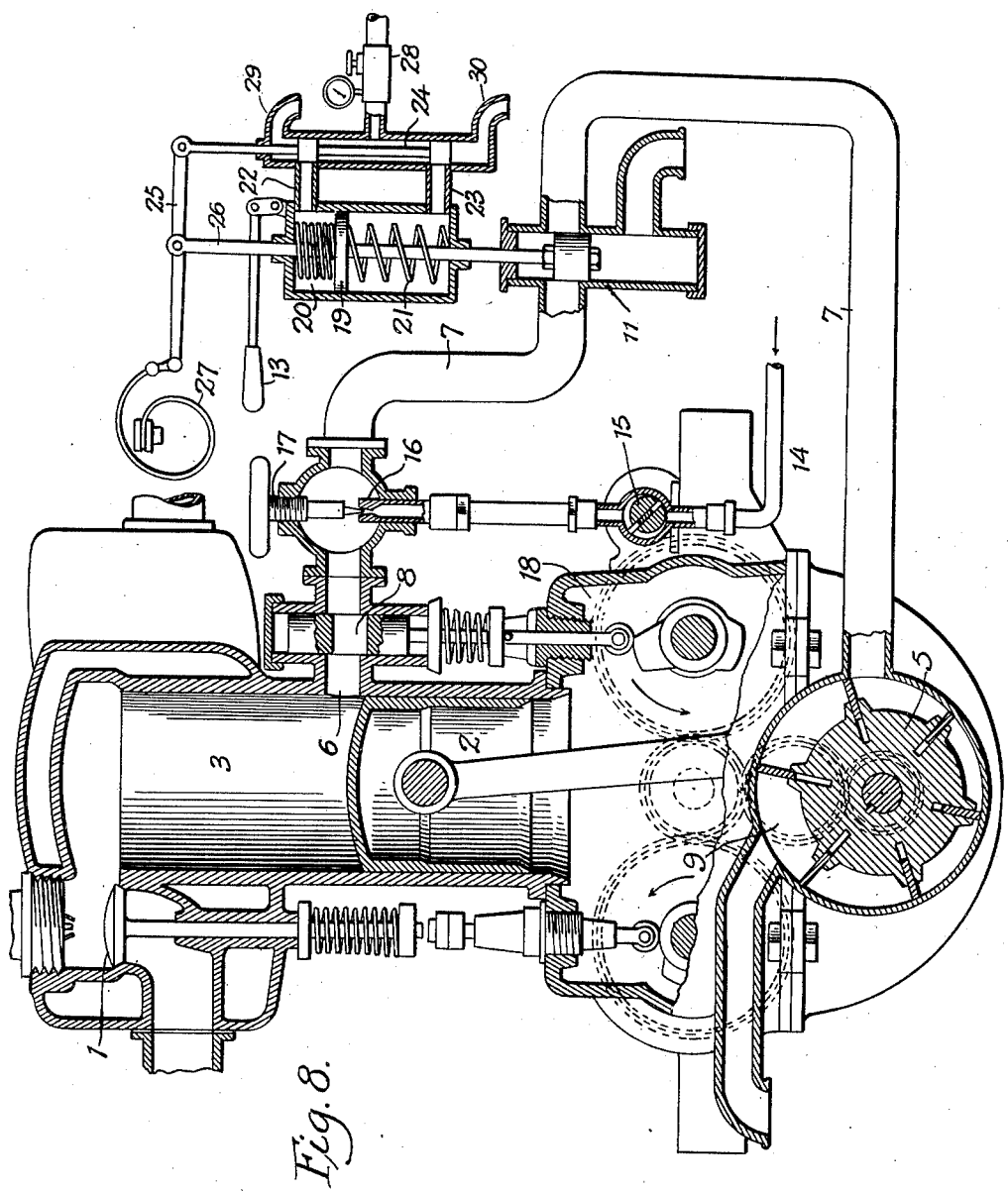

Fig. 8 is a view showing an engine of the type described, having the regulators shown in Figs. 2 and 3.

Throughout the drawings like parts are designated by similar reference characters.

Figure 1:
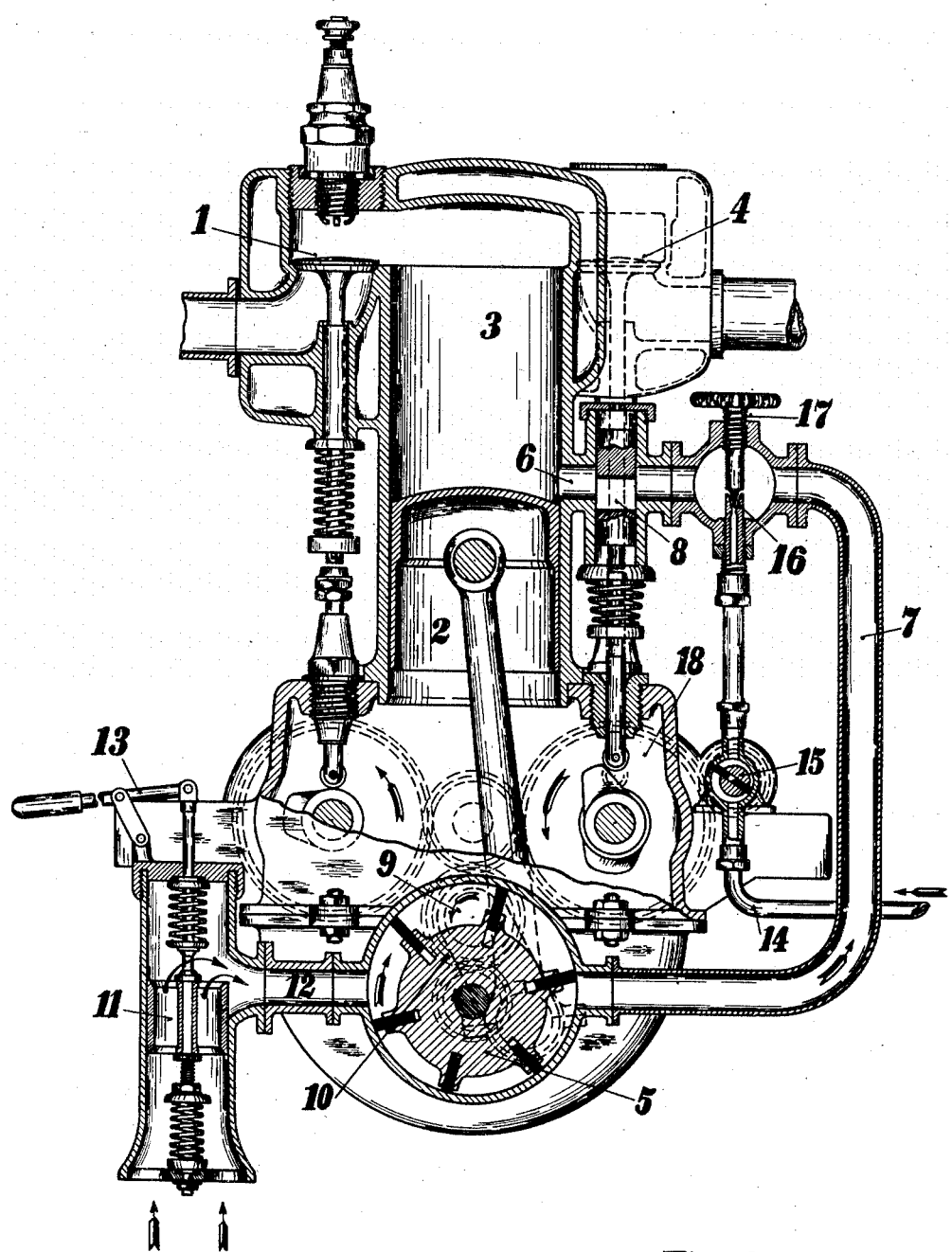
Figure 1 is a cross-sectional elevation of a four-stroke cycle explosion motor, constructed according to one way of carrying out the invention.

In the construction shown in Figure 1, a mixture of air and fuel is drawn from a carburettor (not illustrated) through the inlet valve 1 by the piston 2 into the motor cylinder 3, whence the burnt gases escape through the exhaust valve 4. The said cylinder 3 communicates with the air pump 5 by way of the port 6 and the pressure pipe 7, in which is mounted the slide valve 8 to time the admission of the additional air. The pump 5 is driven from the motor shaft 9 by way of the gearing 10 and is provided with the slide valve 11 in the suction pipe 12 for regulating the quantity of suction air by means of the hand lever 13. There is also fitted in the pressure pipe 7 the fuel pipe 14 in connection with a fuel tank, from which the pump 15 draws and blows through the nozzle 16 fuel against the regulating cone 17, the said fuel pump 15 being actuated by the valve gear 18.

On the downward stroke the piston 2 draws into the cylinder 3 a mixture of air and fuel of atmospheric density. In proximity to the dead centre, the port 6 is uncovered by the piston 2 and the pressure pipe 7 opened by the slide valve 8, whereupon additional air is pumped into the drawn-in charge, while the inlet valve 1 closes. On the compression stroke the slide valve 8 cuts off the air pipe 7 to reopen it only towards the end of the next suction stroke.

On the way to the cylinder of the motor the compressed air in the pipe 7 passes over the nozzle 16. The jet of fuel, as generated by the pump 15, is thrust against the regulating cone 17 and mixed with the additional air, by which the fuel is introduced into the cylinder of the motor.

At low elevations, as for instance at the start, the suction pipe 12 is almost closed by the slide valve 11, that is to say, the air is allowed to enter the pump in such quantity as is necessary to produce in the motor cylinder the requisite pressure. On ascending the throttling is reduced in order to feed the pump with as much more air as is necessary to make up for the loss of pressure within the cylinder of the motor.

The slide valve 11 may also be used as discharging organ in the pressure pipe 7, as shown in Figure 2, wherein the said valve stands almost entirely open.

Figure 3 illustrates a device for automatic regulation of the additional air quantity in co-operation with the atmospheric pressure.

The piston 19 forms part of a double-acting servo-motor commanding the slide valve 11 in the suction pipe 12. The chambers 20 and 21 communicate by the tubes 22 and 23 with the governing piston 24. At the point of fulcrum the lever 25 is supported by the piston rod 26, and at one end connected to the governing piston 24 and at the other end to the barometric Bourdon tube 27. The pressure conduit 28, in which is fitted a reducing valve, opens into an air receiver not shown. When the servomotor is at rest, the outlets 29 and 30 are shut off by the piston 24. By employing the piston rod 26 as fulcrum of the lever 25 the governing piston 24 is balanced and all overregulation of the slide valve 11 in the suction pipe 12 avoided.

On operating in rarefied layers, the barometric tube 27 is released by the decrease in the atmospheric pressure and curves outwardly, thereby drawing the governing piston 24 upwards and causing compressed air to flow into the chamber 20. The air within the chamber 21 discharging through the outlet 30, the piston 19 with the slide valve 11 is lowered to allow the admission of air to the compressor 5 sufficient to maintain the initial pressure in the cylinder of the motor.

The relation between the position of the barometric tube 27 and the effect of the slide valve 11 on the pressure in the pipe 7 may be established by the shaping of the aspiration opening to the pump controlled by said valve.

The shape of the port controlled by valve 11 will differ with the kind of air pump. In piston pumps the pressure is independent of the outside air, but the pressure in blowers decreases with the rarefaction of the atmospheric air. Consequently the shape of the admission port of a blower must be adapted to the decrease in the outside pressure, and is more or less of trapezium shape, as shown in Fig. 4, with the sides of the port spreading with an increased admission to admit proportionately more air as the efficiency of the blower decreases with increasing elevation and air rarefaction.

With piston pumps it is only required that the air admission be decreased proportionately to the greater speed of the motor with rigid propeller at higher altitudes.

Figure 4:
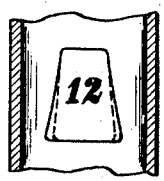
Figure 4 is a detail view of the suction pipe of a rotary blower.
Figure 5:
Figure 5 is a modification of Figure 4, showing the shape of a suction pipe of a piston pump.

Figure 4 illustrates the trapezium shape of the air inlet port for blowers, the dotted lines indicating the narrowing for greater motor speed. Figure 5 that for piston pumps, the ports being controlled by the slide valve 11.

By means of the hand lever 13 engaging on the piston rod 26, the slide valve 11 may be operated at will and without shock, the piston 19 being fitted with springs at either side.

The servomotor may also be worked by oil under pressure, in which case the pipe 28 communicates either with the oil lubrication of the motor, or is fed by a special oil pump, the outlets 29 and 30 then serving as return pipes to the receptacle for oil.

The velocity of the air in the pressure pipe being considerably greater than in the aspiration conduit of the motor, the carburation of heavy grade fuel is possible by means of a special pump forcing the fuel through a nozzle let into the pressure pipe of the supplementary air, with which the finely sprayed fuel is thoroughly mixed and pumped into the cylinder of the motor. In consequence of the negative pressure therein, the compressed additional fuel mixture penetrates the suction charge, with which a homogenous mixture is formed. The higher the elevation, the greater is the pressure of the additional air and the more efficacious the carburation.

If the motor receives combustion air from the additional air pump initially, the carburettor in the aspiration pipe of the motor may be dispensed with and the whole of the combustible introduced by way of the supplementary air. This elimination of carburettor is of particular advantage in connection with single-acting two-stroke cycle engines, where air is drawn into the crank case on the upstroke of the piston, subsequently compressed and then supplied into the cylinder. For the benefit of absolute reliability of the motor the pump in the crank case is then entirely relieved from the propulsion of fuel.

The operation of the motor shown in Fig. 6 differs from that of Fig. 1, in that the air is supplied to the cylinder from the crank case. On the upstroke of the piston 31 air is drawn through a non-return valve 32 into the crank case 33 where it is compressed on the downstroke of the piston and supplied to the cylinder through channel 34 and inlet ports 35, thereby clearing the cylinder of spent gases through the exhaust ports 36. As the piston 31 moves up it early closes the exhaust ports and fresh air is then confined in the cylinder and compressed therein by the continued travel of the piston. By this time the cam 18 has rotated so, that the valve 8 places the inlet 6 in communication with the pressure pipe 7, whereupon additional air from the compressor 5 (Fig. 1) enters the cylinder in quantity sufficient to compensate for the reduction of weight due to rarefaction of the atmosphere.

Connected to the air pipe 7 is the fuel pipe 14, as in Fig. 1 with nozzle 16 and regulating cone 17, whereby the amount of fuel admitted to the engine may be varied at will.

With flying engines it must be considered, that with constant compression the speed increases with the elevation. If the air pump, and with it the fuel pump, is actuated in direct coupling to the working machine and therefore not driven by a special motor of constant speed, an excessive flow of combustible in consequence of motor acceleration may be avoided by throttling the nozzle 16 of Figure 1, or by changing the gear ratio between the engine shaft and the fuel pump.

For the purpose of rendering both components of the motor charge ignitible, the suction mixture, as well as the additional charge, the fuel pump in the pressure pipe 7 of Figure 1 may be substituted by a carburettor in the suction pipe 12 of the air pump 5, as shown in Figure 3.

For flying motors going constantly at full load, the usual carburettor in the aspiration conduit of the motor may be found sufficient and adjusted to suit the fuel for a given compression pressure of the air charge.

If the additional air is admitted at the head of the cylinder, instead of laterally, the clearance space between the auxiliary inlet 6 and the slide valve 8 of Figure 1 may be avoided and the motor provided with three equal valves. For flying motors without silencers, exhausting directly into the open, these valves may be confined to two, provided that the whole of the fuel is injected into the pressure pipe of the additional air.

As shown in Figure 7, the intake and exhaust of the motor are timed by a single valve 37 of conveniently large size opening on the exhaust, keeping open on the intake, closing on and for expansion, the burnt charge escaping by the same valve through which on the subsequent intake stroke fresh air is drawn in and cools the valve heated by the exhaust. The additional air is then timed by the valve 40 operated from the cam shaft 38 by lever and rod mechanism 39, the fuel required for complete combustion being supplied with the additional air in the manner as illustrated in Figure 1.

The advantage obtained by admitting the compressed air at the lower side of the engine cylinder consists in that the admission ports in the cylinder wall are then controlled by the engine piston, whereby time is gained for the opening and closing of the additional air valve.

It is apparent from the foregoing specification that for a serviceable high-altitude motor the two-fold air admission system is indispensable. As the pump delivers air only in addition to the induction charge, which depends on atmospheric pressure, it is of much smaller volume and weight than if it had to supply the whole of the combustion air. The complementary air may therefore be supplied by a pump of the piston type, under pressure sufficient to maintain the cylinder charge constant at all elevations, thereby attaining maximum power and flying speed.

In Fig. 8, in the air line between the pump 5 and the intake 6, the by-pass valve 11 of Fig. 2 is arranged to divert part of the compressed air to the atmosphere, and also the barometric control mechanism, as shown in Fig. 3. The structures of these two control means are the same as shown in Figures 2 and 3, so that one, the barometric control, shall be automatic, and the other, may be a manual control as by lever 13.

What I claim is:

1. The combination with an explosion engine having a valve controlling admission to the cylinder thereof; of an air pump driven by the engine, and an auxiliary valve controlling the admission of compressed air from said pump to the cylinder when said first valve closes, and means to vary the quantity of air delivered by said pump in inverse proportion to the outside air pressure.

2. The combination with an explosion engine having a valve controlling the aspiration; of a rotary air pump geared to the engine crank shaft, a valve timed to admit the discharge from said pump into the aspiration volume of the cylinder on the closing of the first valve, and a barometric device operating to automatically control the pressure of the pump discharge.

3. The combination with an explosion engine having a valve controlling the aspiration of the engine; of a pump to compress additional air for said engine, a valve to admit air to the engine cylinder when the first named valve closes, and means to vary the pressure of the compressed air inversely to the barometric pressure by venting a portion of the compressed air from the pump to the atmosphere in direct proportion to atmospheric pressure.

4. The combination with an explosion engine having a valve controlling the aspiration of the engine; of a pump to compress additional air for said engine, a valve to admit air to the engine cylinder on the closing of the first mentioned valve, and barometric means to automatically vary the pressure of the compressed air inversely to the barometric pressure by venting a portion of the compressed air from the pump to the atmosphere in direct proportion to atmospheric pressure.

5. The combination with an explosion engine having a valve controlling the aspiration of the engine; of a pump to compress additional air for said engine, a valve to admit air to the engine cylinder when the first-named valve closes, and means to vary the pressure of the compressed air inversely to the barometric pressure by venting a portion of the compressed air from the pump to the atmosphere in direct proportion to asmospheric pressure.

6. The combination with an internal combination engine aspirating a cylinder charge at prevailing atmospheric pressure; of an air pump directly operated from the engine and producing at varying altitudes and speed pressure proportional to said altitudes, means to deliver air from said pump into the engine cylinder separately from and independently of the induction charge, and a fuel pump forcing fuel for combustion into the air charge of the engine.

In testimony that I claim the foregoing as my invention, I have signed my name.

FELIX GRÜEBLER.